(12) United States Patent
Jedrusik et al.

(10) Patent No.: US 9,489,628 B2
(45) Date of Patent: Nov. 8, 2016

(54) RULE-BASED INFERENCE SYSTEM AND AN INFERENCE METHOD

(71) Applicant: AKADEMIA GORNICZO-HUTNICZA IM. STANISLAWA STASZICA W KRAKOWIE, Crakow (PL)

(72) Inventors: Stanislaw Jedrusik, Crakow (PL); Andrzej Maciol, Bolechowice (PL)

(73) Assignee: AKADEMIA GORNICZO-HUTNICZA IM. STANISLAWA STASZICA W KRAKOWIE, Krakow (PL)

(*) Notice: Subject to any disclaimer, the term of this patent is extended or adjusted under 35 U.S.C. 154(b) by 66 days.

(21) Appl. No.: 14/092,956

(22) Filed: Nov. 28, 2013

(65) Prior Publication Data
US 2015/0066831 A1 Mar. 5, 2015

(30) Foreign Application Priority Data
Aug. 30, 2013 (PL) ........................................ 405176

(51) Int. Cl.
G06F 17/00 (2006.01)
G06N 5/02 (2006.01)
G06N 5/04 (2006.01)

(52) U.S. Cl.
CPC ................ *G06N 5/025* (2013.01); *G06N 5/04* (2013.01)

(58) Field of Classification Search
None
See application file for complete search history.

(56) References Cited

U.S. PATENT DOCUMENTS

| | | | |
|---|---|---|---|
| 6,741,975 B1* | 5/2004 | Nakisa et al. | 706/47 |
| 7,191,163 B2* | 3/2007 | Herrera et al. | 706/47 |
| 2006/0031182 A1* | 2/2006 | Ryan et al. | 706/50 |
| 2010/0030718 A1* | 2/2010 | Anderson et al. | 706/47 |
| 2010/0318488 A1* | 12/2010 | Oliver et al. | 706/48 |

* cited by examiner

*Primary Examiner* — Luis Sitiriche
(74) *Attorney, Agent, or Firm* — Mark M. Friedman

(57) ABSTRACT

A computer-implemented method for processing rules in an inference system in order to determine the value of a target variable by an inference engine, wherein: the value of the target variable is determined on the basis of a set of rules to define conclusions depending on premises, the premises being functions of values of variables, wherein the variables can be: source variables, having values defined by costs stored in a database, or regulated variables, having values dependent on conclusions of the rules; and wherein the operation of the inference engine (110) is controlled by an inference control module (130) configured to determine a reasoning sequence based on values of costs defined for source variables in the database (140).

4 Claims, 7 Drawing Sheets

RULE R1
IF
Quality_evaluation = "low"
THEN
Technical_evaluation = "low"

RULE R2
IF
Complaints_acceptable = "no"
THEN
Technical_evaluation = "low"

RULE R3
IF
Quality_evaluation = "high" AND
Complaints_acceptable = "yes"
THEN
Technical_evaluation = "high"

RULE R4
IF
Technical_evaluation = "low"
THEN
Supplier = "unsatisfactory"

RULE R5
IF
Technical_evaluation = "high" AND
Economic_evaluation = "high"
THEN
Supplier = "reliable"

RULE R6
IF
Economic_evaluation = "low"
THEN
Supplier = "unsatisfactory"

RULE R7
IF
Price = "below market average"
THEN
Economic_evaluation = "high"

RULE R8
IF
Payment_term = 14 AND
Price = "market average"
THEN
Economic_evaluation = "high"

RULE R9
IF
Payment_term = 30 AND
Price = "market average"
THEN
Economic_evaluation = "low"

RULE R10
IF
Price = "above market average"
THEN
Economic_evaluation = "low"

Fig. 4

RULE R1
IF
Engine_size< 1400
THEN
Base_rate= 500

RULE R2
IF
Engine_size>= 1400 AND
Type_of_use= "personal use"
THEN
Base_rate= 600

RULE R3
IF
Engine_size>= 1400 AND
Type_of_use= "business use"
THEN
Base_rate= 700

RULE R4
IF
Accidentfree_driving_period >= 1 AND
Driver_experience < 10
THEN
Discount = 20

RULE R5
IF
Accidentfree_driving_period >= 1 AND
Driver_experience >= 10
THEN
Discount = 40

RULE R6
IF
Base_rate> 0
THEN
Insurance_cost = Base_rate * (1 – Discount / 100)

RULE R7
IF
Base_rate> 0 AND
Accidentfree_driving_period < 1
THEN
Insurance_cost = Base_rate

Fig. 5

RULE R1
IF
Price = "high"
THEN
Economic_effectiveness = "high"

RULE R2
IF
Price = "low" AND
Lot_size= "low"
THEN
Economic_effectiveness = "low"

RULE R3
IF
Price = "low" AND
Lot_size= "high"
THEN
Economic_effectiveness = "high"

RULE R4
IF
Documentation_availability = "yes"
THEN
Technological_complexity = "low"

RULE R5
IF
Documentation_availability = "no" AND
Documentation_complexity= "low"
THEN
Technological_complexity = "low"

RULE R6
IF
Documentation_availability = "no" AND
Documentation_complexity= "high"
THEN
Technological_complexity = "high"

RULE R7
IF
Economic_effectiveness = "low" AND
Technological_complexity = "high"
THEN
Order_profitability= "low"

RULE R8
IF
Economic_effectiveness = "high" AND
Technological_complexity = "high"
THEN
Order_profitability= "market average"

RULE R9
IF
Economic_effectiveness = "low" AND
Technological_complexity = "low"
THEN
Order_profitability= "market average"

RULE R10
IF
Economic_effectiveness = "high" AND
Technological_complexity = "low"
THEN
Order_profitability= "high"

RULE R11
IF
customer_evaluation = "positive"
THEN
Order_evaluation= "positive"

RULE R12
IF
Order_profitability= "market average" AND
customer_evaluation = "negative"
THEN
Order_evaluation= "negative"

RULE R13
IF
Order_profitability= "high"
THEN
Order_evaluation= "positive"

RULE R14
IF
Order_profitability= "low"
THEN
Order_evaluation= "negative"

RULE R15
IF
Customer_record= "no data" AND
External_customer_evaluation = "negative"
THEN
customer_evaluation = "negative"

RULE R16
IF
Customer_record= "no data" AND
External_customer_evaluation = "positive"
THEN
customer_evaluation = "positive"

RULE R17
IF
Customer_record= "positive"
THEN
customer_evaluation = "positive"

RULE R18
IF
Customer_record= "negative"
THEN
customer_evaluation = "negative"

Fig. 6

RULE-BASED INFERENCE SYSTEM AND AN INFERENCE METHOD

BACKGROUND OF THE INVENTION

1. Field of the Invention

The present invention relates to a rule-based inference system.

2. Description of the Related Art

In computer science, and specifically the branches of knowledge engineering and artificial intelligence, an inference engine is a computer program that attempts to derive answers from a knowledge base. The inference engine is "the brain" that expert systems use to reason about the information available in the knowledge in order to formulate new conclusions. (source: Wikipedia).

Inference engines of various types are described in the following patent documentation.

A US patent application US20110219355 describes a system for authoring and translation of business rules onto computer executable instructions. The system contains a translator module enabling translation of rules input in a specified language into a code (e.g. in Java programming language), enabling processing of instructions contained in the code in the appropriate module of the patented system. The system also enables automatic transfer of translated rules to the execution module with built-in business rules engine specifying in what way individual tasks or messages are to be processed.

A U.S. Pat. No. 8,196,126 describes a system for dynamically generating and optimizing code for business rules. Unlike other applications for inputting rules, where mainly the mechanism for inputting conditions for rules by business user is described, this solution concentrates on the aspects concerning translation of the defined sets of rules into a set of computer readable instructions.

The U.S. Pat. No. 8,140,362 describes a method for using business rules to input dynamic changes and update in content management system. The document describes the selection of an appropriate set of rules depending on the type of input data, using one type of applying (forward, backward, or mixed) depending on the method of description of the specific set of rules, as well the possibility to update and modify the set of rules.

A U.S. Pat. No. 7,257,579 discloses an application for managing sales transactions and deliveries to customers. It enables defining business rules and introduces their classification into specific types of business rules. The created types of rules enable quick searching in the rules repository and invoking appropriate actions. The application enables modification of the business rules execution sequence.

A U.S. Pat. No. 5,119,470 presents an inference engine module based on rules repository. The presented solution was created with a view to expert systems, in order to improve the decision making process based on input data. The solution enables creation of modules responsible for forward and backward reasoning, development of the control module responsible for the selection of the appropriate reasoning type for specific input data, and application of Rete's algorithm in the inference process.

A US patent application US20090112654 describes a system for quality assurance in business rule management system. It involves automatically executing tests on rule repository, repeated after each change in the rule repository, as well as creation of a repository of tests to check the logical and formal validity of the defined rules.

In the rule management systems known till now, it is assumed that all source data necessary to draw a conclusion for an identified rule are available or can be obtained. It would be useful to improve the systems known so far in order to allow more freedom in defining the availability of source data.

SUMMARY OF THE INVENTION

The object of the invention is a computer-implemented method for processing rules in an inference system in order to determine the value of a target variable by an inference engine, wherein: the value of the target variable is determined on the basis of a set of rules to define conclusions depending on premises, the premises being functions of values of variables, wherein the variables can be: source variables, having values defined by costs stored in a database, or regulated variables, having values dependent on conclusions of the rules; and wherein the operation of the inference engine is controlled by an inference control module configured to determine a reasoning sequence based on values of costs defined for source variables in the database.

Preferably, the method further comprises the steps of: reading cost of each source variable from the database, identifying target rules allowing to determine the value of the target variable, determining the cost of evaluation of premises and conclusions for each target rule, evaluating the least costly premise in the least costly rule and recalculating the cost of evaluation of premises and conclusions for the remaining rules, based on results of the evaluation, returning to evaluation of the least costly target rule, until the value of the target variable has been determined.

Preferably, the order of reasoning is determined by placing the rules in order from the least costly rule to the most costly rule on a stack.

Preferably, the stack contents are stored in the database before the evaluation of the premise, and wherein the stack is released for other calculations, the readout of the variable value enabling evaluation of the premise is expected, and after that the previous content of the stack is restored from the database.

Preferably, the cost of evaluation of premises and conclusions for each rule is calculated as the sum of costs of variables contained in the premises and the conclusions for that rule.

Another object of the invention is a computer program comprising program code means for performing all the steps of the computer-implemented method according to the invention when said program is run on a computer.

A further object of the invention is a computer-implemented inference system for processing rules, the system comprising: an inference engine configured to determine a value of a target variable on the basis of a set of rules to define conclusions depending on premises, the premises being functions of values of variables, wherein the variables can be: source variables, having values defined by costs stored in a database, or regulated variables, having values dependent on conclusions of the rules; an inference control module configured to control the inference engine by determining the reasoning order on the basis of values of costs attributed to individual source variables in a database.

BRIEF DESCRIPTION OF DRAWINGS

The invention is presented by means of exemplary embodiments on a drawing, in which:

FIG. 4 presents a first set of rules explaining the operation of the inference system according to the invention;

FIG. 5 presents a second set of rules explaining the operation of the inference system according to the invention;

FIG. 6 presents a third set of rules explaining the operation of the inference system according to the invention;

DETAILED DESCRIPTION OF THE PREFERRED EMBODIMENTS

Figure 1:
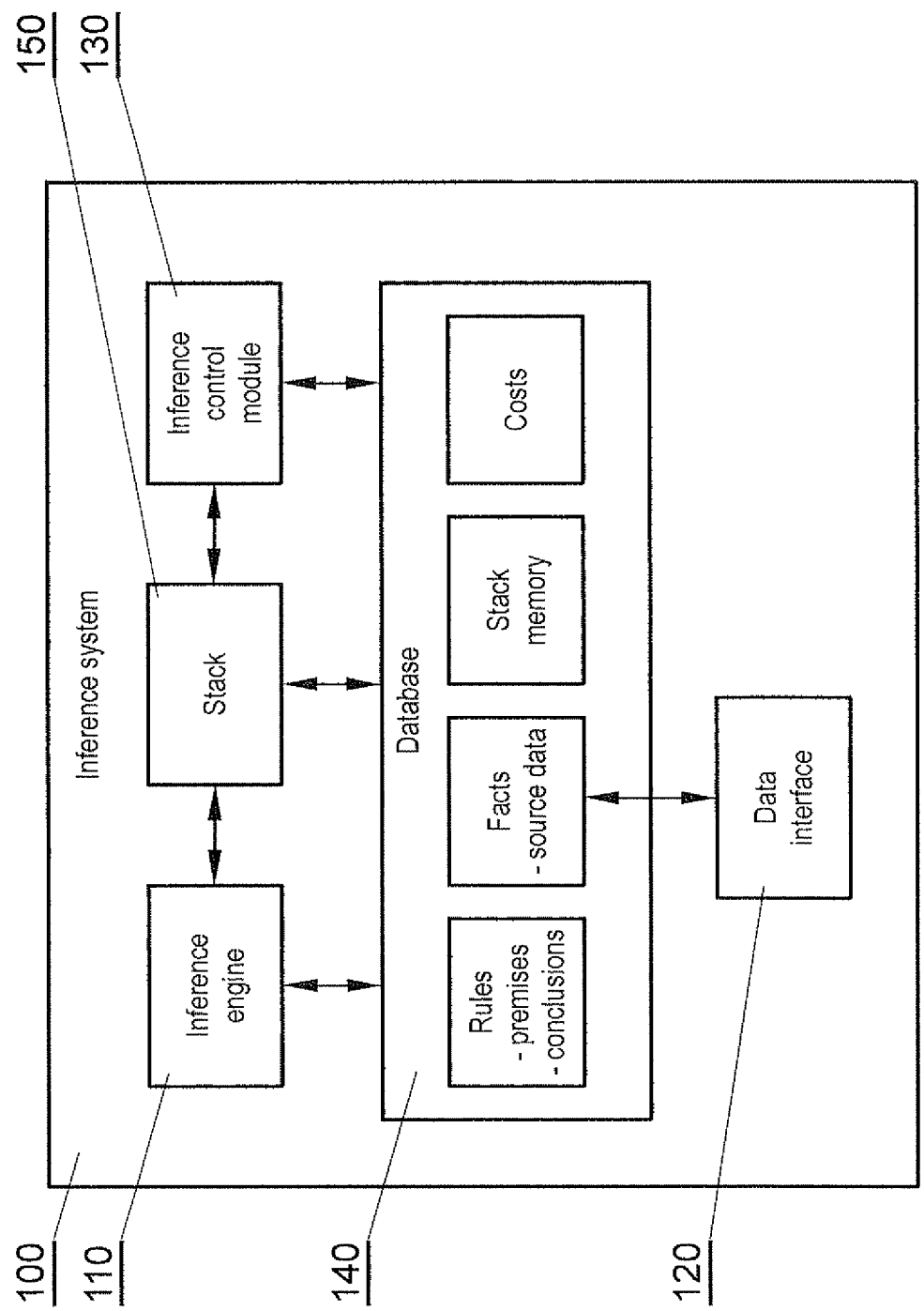
FIG. 1 presents a general diagram of the system according to the invention.

The invention relates to an inference system 100 based on a set of rules, having a general construction as presented in FIG. 1. Each rule contains at least one premise whose value is tested by an inference engine 110. The validity of all premises results in execution of the conclusion set for the rule. There is no limitation on the premises implementation method in the rule description language. They can be terms in the meaning of propositional calculus, predicate calculus or other first order logical systems. In case of rules formulated in propositional calculus language, the conclusions are propositional variables whose logical value is determined by the rule. In other logical systems, the conclusion is an assignment statement determining the predicate value, object or variable features.

The reasoning is carried out on a set of facts comprising propositional variables, predicates, object features and variables, the value of which is known or can be determined. The values of individual variables are assigned by data interface 120 independent of the inference engine, responsible for the communication with the system user, i.e. a human or a machine.

The inference system according to the invention is applicable particularly in situations when the values of all source atomic values are not known upon the commencement of reasoning, while not all values have to be known in order to determine the conclusion interesting to the user.

The inference engine 110 meets the following preliminary requirements:
the engine implements a forward and backward reasoning strategy;
the analysis sequence is not determined in any way in the rule structure;
a rule that was used once cannot be analyzed for the second time.

Figure 2:
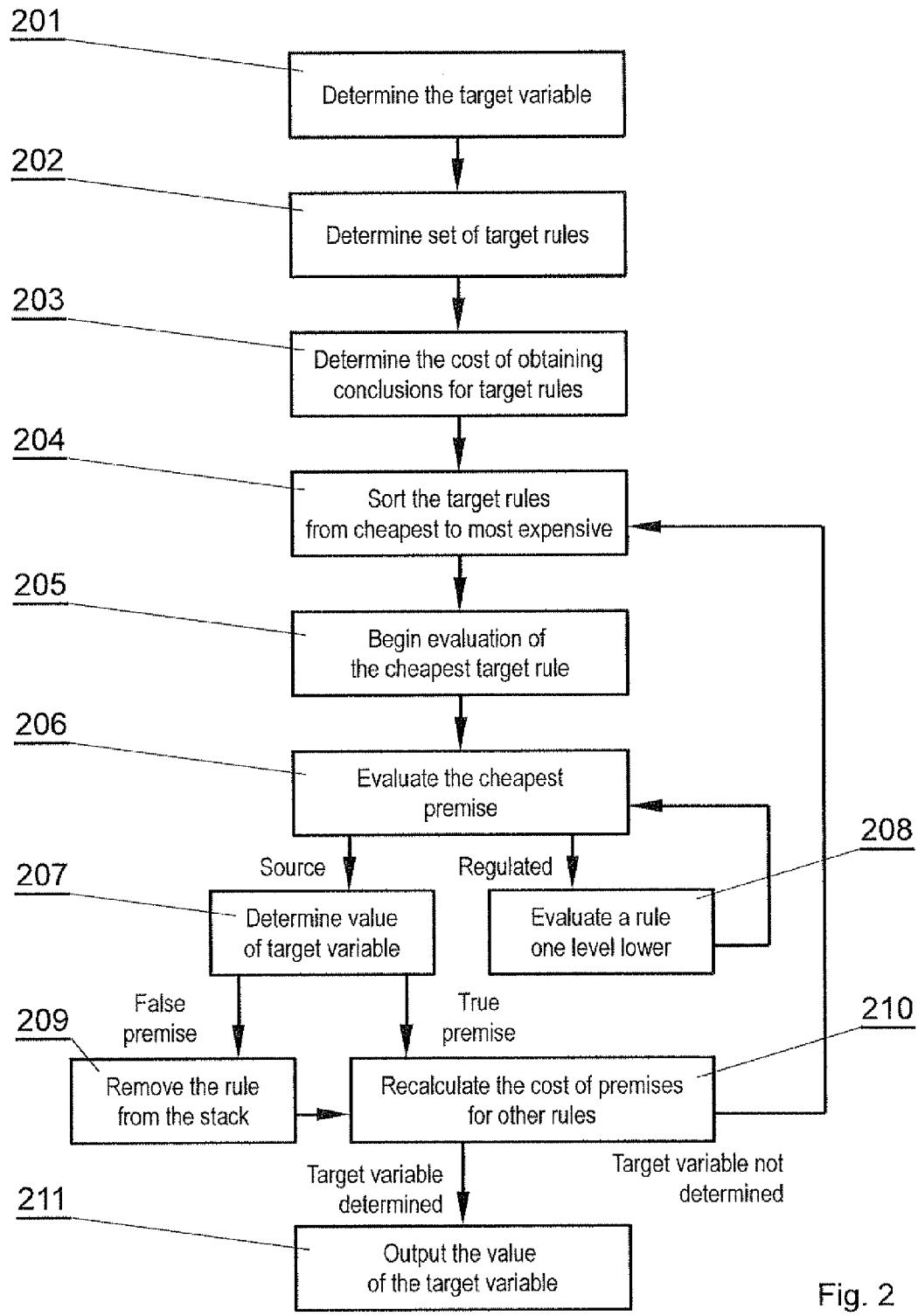
FIG. 2 presents a diagram of operation of the inference system according to the invention.

The inference system 100 according to the invention, besides the inference engine 110, further comprises an inference control module 130, implementing the method of indicating and executing the sequence of rule analysis by the inference engine 110, as indicated in FIG. 2.

According to the invention, the reasoning process is accomplished sequentially and gathering information on the term value has an associated cost.

There is also a predetermined reasoning target, understood as an variable whose value is to be established.

The role of the control module is to determine a sequence of queries on source data, which are necessary to determine the target value of the term, such that the total cost associated with the acquisition of data is the lowest. Rules, facts and costs associated with the acquisition of source data are stored in a database 140.

The inference engine 110 evaluates the rules according to their order of arrangement on a stack 150, and that order is set by an inference control module 130. In cases when the determination of the values of some variables requires time, the current content of the stack 150 can be stored in the database 140 in order to return to the current reasoning state after the value of the variable has been determined (as illustrated by the third embodiment in FIG. 6).

FIG. 2 presents the diagram of operation of the inference system according to the invention. In the first step, 201, the target value is determined. The target value is the reasoning target, whose value is to be determined by means of the inference engine based on the rules. Next, in step 202, a set of target rules is determined. That set contains rules whose conclusions assign a value to the target variable. Then, in step 203, which is executed subsequently for each target rule, the cost associated with the acquisition of conclusion for the particular rule is determined. The cost is determined by the procedure of FIG. 3. Then, in step 204, the target rules are sorted from the cheapest rule (i.e. related to the lowest cost) to the most expensive rule (i.e. related to the highest cost). The rules are ordered on a stack of tasks to be executed. Next, in step 205, the inference engine begins to evaluate the cheapest rule. In step 206, it searches for the cheapest premise for the particular rule and evaluates it. If the premise contains a source variable (which is a variable independent on other variables, whose cost can be determined directly), then the value of this variable is determined in step 207. If the premise contains a dependent variable (which is a variable whose value depends on a conclusion of another rule), then, in step 208, the rule which is one level lower is evaluated to assign a value to this variable. If the premise is false, then, in step 209, the currently evaluated rule is removed from the stack. Next, in step 210 the cost of the variables and rules associated with the recently evaluated variable is estimated by assuming the cost of the evaluation of this variable to be zero, since it has been already evaluated. After that, the procedure returns to step 204, where the target rules are sorted again from the cheapest to the most expensive rule, and the analysis is continued beginning from the currently cheapest rule. If the value of the target variable has been determined, it is output as a result of the reasoning in step 211.

Figure 3:
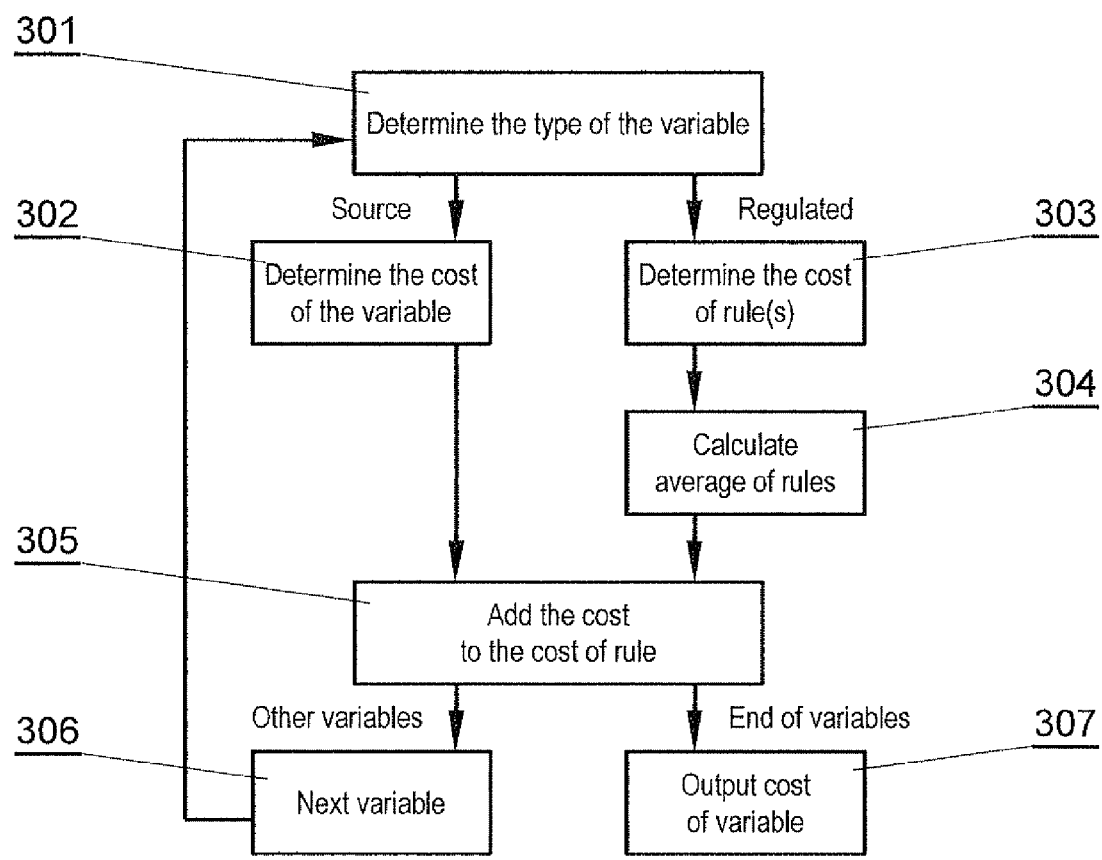
FIG. 3 presents a procedure for determining the cost of a rule.

FIG. 3 presents a procedure to determine the cost of a rule. The cost of a rule is determined as the sum of costs of variables associated with its premises and conclusions. In step 301, the identifier of the first variable specified in the rule is read and it is checked whether it is a source variable or a regulated variable. If it is a source variable, then, in step 302, the cost of this variable is read from the database. If it is a regulated variable, then, for each rule which sets the value of this variable, the individual cost is determined in step 303. In step 303, the procedure of FIG. 3 is executed for each rule. Next, if the value of the variable depends on a number of rules, then in step 304 an average value is calculated, for example an arithmetic average of the costs of all these rules. Next, the calculated cost 305 is added to the previously determined cost of the rule (the initial cost is zero by default) and it is checked whether there are any other variables present in the rule—if there are, the procedure begins analysis of the next variable in step 306. If all variables in the particular rule have been analyzed, the cost determined for the rule is output as the result of operation of the procedure in step 307.

Example 1

Selecting a Supplier of Materials for Production

FIG. 4 presents a first set of rules to explain the operation of the inference system according to the invention.

The presented set of rules is related to a system for evaluation of a supplier of batch materials. The potential suppliers are classified according to a scale (reliable; unsatisfactory). The following features of the bid are subject to evaluation:
- price (below market average; market average; above market average),
- technical evaluation of the offer (low; high), which depends on
  - quality evaluation (low; high),
  - acceptance of complaints (yes; no).

Case A:

Let's assume that the cost of obtaining information is identical for each source variable (for example, it equals 1).

The reasoning proceeds as follows:

(1) In step 201, the user sets the reasoning target as the value of the Supplier variable. Then, the Inference Control Mechanism (the ICM) searches for target rules for this variable in step 202, i.e. the rules whose conclusions contain the Supplier variable; these are rules R4, R5, and R6.

(2) For each of these rules, the cost is determined, in step 203, as the sum of the costs of variables contained in their premises.

For rule R4, the only variable in its premises is Technical_evaluation; its cost is the arithmetic average of the costs of rules where it is contained as conclusion; these are rules R1, R2, and R3; the premises of these rules contain source variables only (having a cost of 1); the cost of these rules is respectively 1 for R1 and R2 and 2 for R3; the cost of the Technical_evaluation variable is therefore:

$$VC(\text{Technical\_evaluation})=(1+1+2)/3=1.33$$

Therefore, the cost of rule R4 is 1.33;

The premises of rule R5 contain two variables: Technical_evaluation and Economic_evaluation; it is already known that VC(Technical_evaluation)=1.33; the cost of Economic_evaluation variable is the arithmetic average of the costs of rules where it is contained as a conclusion: these are rules R7, R8, R9, and R10; these rules contain only source variables in their premises; the cost of these rules is respectively 1 for R7 and R10 and 2 for R8 and R9; the cost of Economic_evaluation variable is therefore:

$$VC(\text{Economic\_evaluation})=(1+1+2+2)/4=1.50$$

Therefore, the cost of rule R5 is 1.33+1.50=2.83;

The premises of rule R6 contain only one variable, namely Economic_evaluation, the cost of which is 1.50. Therefore, the cost of rule R6 equals 1.50.

(3) The ICM orders the rules from the cheapest to the most expensive rule in step 204, placing them on stack of tasks to be executed as follows: R4, R5, R6.

(4) The Inference Engine (the IE) begins to evaluate the cheapest rule R4 in step 205; the ICM searches for the cheapest premise (there is only one—Technical_evaluation); The IE begins to determine its value according to the principles presented in point 2 (searching for the cheapest rule determining the variable); the cheapest rule determining the Technical_evaluation variable is rule R1.

(5) The IE begins to evaluate rule R1; the ICM searches for the cheapest premise (there is only one—Quality_evaluation); since it is a source variable, an inquiry on its value is sent via the data interface (which generates a certain cost) in step 207.

(6) Let's assume that the value of the Quality_evaluation variable is "high"; the premise in rule R1 is not satisfied (since the required value for premise R1 is 'low'), so the IE removes it from the stack in step 209 and the ICM modifies the costs of all variables and rules associated with the Quality_evaluation variable in step 210. At that moment, the cost of rule R3 is set to 1 (the cost of the Quality_evaluation variable has already been incurred, so the cost of this variable is reset) and the cost of rule R4 is set to the value of the arithmetic average of the costs of rules R2 and R3, that is 1. Therefore, rule R4 remains to be the cheapest target rule.

(7) The IE returns to the stack of rules in step 204, determining that rule R4 remained the cheapest target rule, so it selects the next cheapest premise, selecting the next rule in step 206 (e.g. R2) and begins to evaluate it; the ICM searches for the cheapest premise (it is Quality_evaluation="high" having a cost of 0); the IE determines the premise to be true and searches for another cheapest one (Complaints_acceptable="no"); since Complaints_acceptable is a source variable, the IE sends a query on its value via the data interface in step 207.

(8) Let's assume that the value of variable Complaints_acceptable is "no"; the IE confirms another (the last one) premise and then executes rule R2; in consequence, the Technical_evaluation variable is assigned the value of "low"; simultaneously, rule R3 is removed from the stack.

(9) The IE returns to the rule R4 remaining on the top of the stack; the rule has only one premise Technical_evaluation="low" which is true; the IE executes rule R4, determining the value of Supplier variable as "unsatisfactory".

(10) Since the final condition (determining the value of the target variable—Supplier) has been achieved, the procedure stops inferring in step 211.

Alternative Scenario (6a) Let's assume that the value of Quality_evaluation is "low"; the only premise in rule R1 is met, so the IE executes the rule; in consequence, the Technical_evaluation variable is assigned the value of "low"; simultaneously, rules R2 and R3 are removed from the stack and the ICM modifies the costs of all variables and rules associated with the Quality_evaluation; the IE proceeds to the next step of inference (point 9).

Case B:

Let's assume that the evaluation of the quality of the offered materials requires research. Therefore, it has been established that the cost of acquisition of the Quality_evaluation variable equals 4 and the cost of acquisition of other variables values equals 1. The reasoning will proceed as follows:

(1) The same as step 1 for case A.

(2) For each of the following rules the cost is determined as the sum of the costs of variables contained in their premises; For rule R4 the only variable in its premises is the Technical_evaluation; its cost is the arithmetic average of the costs of rules where it is contained as a conclusion; these are rules R1, R2 and R3; only source variables are contained in their premises (the default cost of Quality_evaluation variable is 4 and that of Complaints_acceptable is 1); the costs of these rules are respectively:

the cost for R1 is 4;
the cost for R2 is 1; and
the cost for R3 is 5;

the cost of Technical_evaluation variable is:

$$VC(\text{Technical\_evaluation})=(4+1+5)/3=3.33$$

which results in the cost of rule R4 being 3.33;

Rule R5 has two variables in its premises—Technical_evaluation and Economic_evaluation; as is already known, VC(Technical_evaluation)=3.33; the cost of Economic_evaluation variable is the arithmetic average of the costs of rules where it is contained as conclusion; These are rules R7, R8, R9 and R10; there are only source variables in their premises; the costs of these rules are, respectively, 1 for R7 and R10 and 2 for R8 and R9; the cost of the Economic_evaluation variable is:

$$VC(\text{Economic\_evaluation})=(1+1+2+2)/4=1.50$$

which results in the cost of rule R5 being equal to 3.33+1.50=4.83;

There is only one variable the premises of rule R6—Economic_evaluation, whose cost equals 1.50, therefore the cost of rule R6 equals 1.50.

(3) The ICM orders the rules from the cheapest to the most expensive rule, placing them on a stack of tasks to be executed: R6, R4, R5.

(4) The Inference Engine (the IE) begins to evaluate the cheapest rule, R6; the ICM searches for the cheapest premise (there is only one premise—Economic_evaluation); the IE begins to determine its value according to the principles presented in point 2 (searching for the cheapest rule determining that variable); the cheapest rules determining the Economic_evaluation variable are rules R7 and R10.

(5) The IE begins to evaluate rule R7; the ICM searches for the cheapest premise (there is only one—Price); since it is a source variable, the IE sends an inquiry on its value to the data interface;

(6) Let's assume that the value of the Price variable is "above average"; the premise of rule R7 is not satisfied, so the IE removes it from the stack and the ICM modifies the costs of all variables and rules associated with the variable Price.

(7) The IE returns to the stack of rules, selects the next rule (R10) and begins to evaluate it; the ICM searches for the cheapest premise (it is Price="above average" having a cost of 0); the IE determines the premise to be true and since there is no other premise, it executes rule R10; in consequence, the Economic_evaluation variable is assigned the value of "low"; simultaneously, rules R8 and R9 are removed from the stack.

(8) The IE returns to rule R6 remaining on the top of the stack; the rule has one premise: Economic_evaluation="low", which is true; the IE executes rule R5, determining the value of Supplier variable as "unsatisfactory".

(9) Since the final condition (determining the value of the target variable—Supplier) has been achieved, the IE stops reasoning.

Case B presented above proves that the system according to the invention allows to control reasoning in a way allowing to avoid "costly" procedures of data acquisition as much as possible.

Example 2

Determining a Cost of Insurance

FIG. 5 presents a second set of rules to explain the operation of the inference system according to the invention.

The presented set of rules concerns a system for determining a cost of vehicle insurance. The example illustrates that the variables entered in conclusions should also be taken into account when estimating the costs of rules.

Let's assume that an insurance company uses a rule-based system to determine the annual cost of vehicle insurance. The cost is determined as the product of a base rate and a discount:

$$\text{Insurance\_cost}=\text{base rate}*(1-\text{Discount}/100)$$

The base rate depends on engine size of the vehicle and the type of use (personal use, business use). The discount depends on the period of accident-free exploitation of the vehicle and the experience of the driver.

Case A:

Let's assume that only the variables contained in the rule premises are taken into account on calculation of rule costs and the variables contained in the conclusions of the rule are disregarded. Let's also assume that checking the declaration on damage-free driving requires verification and therefore the cost of obtaining the value of Accidentfree_driving_period is 3, and the cost of obtaining other information is 1. The reasoning will proceed as follows:

(1) After the user establishes, in step 201, that the reasoning target is the value of Insurance_cost, the ICM searches for target rules in step 202, whose conclusions contain the Insurance_cost variable; these are rules R6 and R7.

(2) For each of these rules the cost is determined, in step 203, as the sum of the costs of variables contained in their premises;

For rule R6, the only variable in its premises is the Base_rate; its cost is the arithmetic average of the costs of rules where it is contained as a conclusion; these are rules R1, R2 and R3; their premises contain only source variables having a cost of 1; the costs of these rules are, respectively: 1 for R1, 2 for R2, and 2 for R3; the cost of the Base_rate variable is:

$$VC(\text{Base\_rate})=(1+2+2)/3=1.67$$

which results in the cost of rule R6 being 1.67;

For rule R7, there are two variables in the premises: Base_rate and Accidentfree_driving_period; VC(Base_rate)=1.67; the Accidentfree_driving_period is a source variable and its cost is 3; therefore, the cost of rule R7 is 4.67.

(3) The ICM orders the rules, in step 204, from the cheapest to the most expensive rule, placing them on stack of tasks to be executed: R6, R7.

(4) The Inference Engine (IE) begins, in step 205, to evaluate the cheapest rule, R6; the ICM searches for the cheapest premise in step 206 (there is only one—Base_rate); In step 208, the IE begins to determine its value according to the principles presented in point 2 (searching for the cheapest rule for determining that variable); the cheapest rule for determining the Base_rate variable is rule R1.

(5) In step 208, the IE begins to evaluate rule R1; the ICM searches for the cheapest premise (there is only one—Engine_size); since it is a source variable, the IE sends an inquiry about its value to the data interface.

(6) Let's assume that this value is 1200; the premise of rule R1 is fulfilled, so the IE determines, in step 210, that the value of the Base_rate variable is 500, removing at the same time rules R1, R2 and R3 from the stack.

(7) The IE returns in step 204 to rule R6 which remains on the top of the stack; the rule has only one premise, Base_rate>0, which is true; the IE executes rule R6 and begins to evaluate the conclusion $$\text{Insurance\_cost}=\text{Base\_rate}*(1-\text{Discount}/100)$$

the value of the Base_rate variable is known, but it is necessary to determine the value of the Discount variable;

since it is not a source variable, the IE searches for rules whose conclusions determine that variable; these are rules R4 and R5; the ICM determines their costs; the costs of both rules are the same and equal 4 (the cost of Accidentfree_driving_period is 3 and the cost of the Driver_experience variable is 1).

(8) The IE starts verification of rule R4 and the ICM searches for the cheapest premise (Driver_experience); since it is a source variable, the IE obtains its value via the data interface in step 207.

(9) Let's assume that the value of Driver_experience is 5; the premise of rule R4 is fulfilled and the IE determines the value of the next source variable, Accidentfree_driving_period.

(10) Let's assume that the value of Accidentfree_driving_period is 0; the premise Accidentfree_driving_period>=1 has not been met and the IE removes rule R4 from the stack and selects rule R5.

(11) The value of both variables of the premises of rule R5 are known; the second premise is false, so the IE removes rule R5 from the stack and, due to the lack of further rules determining the value of Discount, also rule R6.

(12) The IE returns to the stack of rules and selects the remaining rule R7; both values of the variables in the premises are known and also the variable contained in the conclusion is known; the IE states that the premises are correct and assigns the value of the variable Base_rate (in this case 500) to the resulting Insurance_cost variable.

(13) Since the final condition (determining the value of the target variable, Insurance_cost) has been reached, the IE stops reasoning in step 211.

The reasoning sequence presented above proves that disregarding the costs of obtaining the values of variables occurring in conclusions leads to serious errors in control. The ICM determined that the reasoning shall commence with rule R6, which in consequence led to the elongation of the reasoning process and asking unnecessary questions (about the value of the Driver_experience variable), which became evident later.

Case B:

Let's assume the same conditions as in case A. Let's also assume that the values of source variables are identical. The only difference relies on including the costs of variables contained in conclusions in calculation. The reasoning will proceed as follows:

(1) The same as step 1 for case A.

(2) For each of these rules the cost is determined as the sum of the costs of variables contained in the premises;

For rule R6, the only variable in the premises is the Base_rate, whereas the conclusion further contains the variable Discount; the cost of the Base_rate variable is calculated like in step 2 for case A and amounts to 1.67. The cost of the Discount variable is the arithmetic average of rules R4 and R5 where two source variables are contained: Accidentfree_driving_period with the cost of 3 and the Driver_experience with the cost of 1; therefore, the cost of both rules is 4, which results in the cost of the Discount variable being also 4; consequently, the cost of rule R6 is:

$$RC(R6)=1.67+4=5.67$$

The cost of rule R7 is determined as in step 2 for case A, and it is 4.67.

(3) The ICM orders the rules from the cheapest to the most expensive one, placing them on the stack of tasks to be executed: R7, R6.

(4) The Inference Engine (the IE) begins to evaluate the cheapest rule, R7; the ICM searches for the cheapest premise (which is Base_rate); the IE begins to determine its value; the cheapest rule determining the Base_rate variable is rule R1.

(5) The IE begins to evaluate rule R1; the ICM searches for the cheapest premise (there is only one—Engine_capacity); since it is a source variable, the IE sends an inquiry about its value to the data interface.

(6) Let's assume that the value is 1200; the premise of rule R1 is achieved, so the IE determines that the value of the Base_rate variable is 500, simultaneously removing R2 and R3 from the stack.

(7) The IE returns to rule R7 remaining on top of the stack; the premise Base_rate>0 is true and the IE proceeds to evaluate the premise Accidentfree_driving_period<1; since the Accidentfree_driving_period is a source variable, the IE queries the data interface on its value.

(8) Let's assume that the value is 0; the premise Accidentfree_driving_period<1 has been met; the IE states that both premises are correct and assigns the value of the variable Base_rate (in this case 500) to the resulting Insurance_cost variable.

(9) Since the final condition (determining the value of the target variable, Insurance_cost) has been met, the IE stops reasoning.

As it can be seen, appropriate determination of the cost of rules simplifies the reasoning process significantly, while making it possible to avoid searching for information that is not necessary to reach the goal.

Example 3

Evaluation of Customer's Order

FIG. 6 presents a third set of rules to explain the operation of the inference system according to the invention.

The presented set of rules relates to a system for evaluation of customer's order. The aim of the example is to demonstrate how to control reasoning in order to avoid the necessity to obtain external data and how the IE resumes reasoning after it has been suspended.

Enterprises who manufacture and sell their products to the market face the problem of evaluating the profitability of customer's orders. Let's assume that a rule-based system shall indicate whether the order is to be accepted or rejected. First of all, the economic profitability of the order is taken into account, which depends on the relation of the offered price to the manufacturing costs and the lot size, as well as the technological complexity depending on the availability of documentation and (in case of lack of documentation) on the difficulty level of its development. In case when the effectiveness is average or low, the ordering party is additionally verified on the basis of evaluation of transaction history. Lack of history results in the necessity to order external evaluation (which is costly and time consuming). For that time the reasoning is suspended. After the evaluation is obtained, the reasoning is resumed from where it was suspended.

Since the details of operation of the IE and the ICM have been presented in previous examples, the description of the reasoning sequence in this example shall be simplified. It has been assumed that the cost of external customer evaluation is high and therefore the External_customer_evaluation variable has been assigned the value of 6 and the cost of other variables is 1.

Case A (1) After the user has established that the reasoning target is the value of the variable Order_evaluation, the ICM searches for target rules whose conclusions contain Order_evaluation; these are rules R11, R12, R13 and R14.
(2) For each of these rules, the cost is determined as the sum of the costs of variables contained in the premises;
There is one variable, Customer_evaluation, in rule R11; the cost of this variable is the average of costs of rules: R15 (7), R16 (7), R17 (1) and R18 (1)—it equals 4—

$$RC(R11)=4;$$

there are two variables, Customer_evaluation and Order_profitability in R12; the cost of the first one is known and the cost of the second one is the average of the costs of rules: R7, R8, R9 and R10; the cost of rule R7 is the sum of costs of variables: Economic_effectiveness (average of RC (R1)=1, RC(R2)=2, and RC(R3)=2, equal to 1.67) and Technological_complexity (average of RC(R4)=1, RC(R5)=2, and RC(R6)=2, equal to 1.67) and equals 3.33; the costs of rules R8, R9 and R10 are the same; in consequence:

$$RC(12)=4.00+3.33=8.33;$$

the cost of rules R13 and R14 depends on the cost of Order_profitability variable and equals 3.33.
(3) The ICM orders the rules from the cheapest to the most expensive one, placing them on a stack of tasks to be executed: R13, R14, R11, R12.
(4) The IE begins to evaluate the cheapest rule, R13; the ICM searches for the cheapest premise (it is Order_profitability); the IE begins to determine its value searching for the cheapest rule determining that variable; all rules determining the Order_profitability variable (R7, R8, R9, and R10) have the same cost.
(5) The IE begins to evaluate rule R7; the ICM searches for the cheapest premise (both Economic_effectiveness and Technological_complexity have the same cost). The IE places them on the stack.
(6) The IE begins to determine the value of the Economic_effectiveness value, searching for rules with premises that contain it and the ICM orders them according to the cost and places them on the stack; the cheapest rule is rule R1 with the Price variable contained in its premise;
(7) Let's assume that the value of the Price variable is "high"; the IE determines the value of Economic_effectiveness variable as "high", selects rule R4, depending on Documentation_availability variable, from the stack.
(8) Let's assume that its value is "yes"; the IE confirms rule R4 and in consequence rejects rule R7, selecting rule R8 from the stack.
(9) Rule R8 and the next rule R9 both have false premises and are removed from the stack, but rule R10 has two true premises, so the IE sets the value of the Order_profitability variable to "high".
(10) The IE returns to rule R13 remaining on the stack and executes it, assigning the value of "accept" to the target variable—Order_evaluation.
(11) Since the final condition (determining the value of the target variable, Order_evaluation) has been met, the IE stops reasoning.
Case B
Let's assume that the source variable Price is "high", Documentation_availability is "no", Documentation_complexity is "high", Customer_record is "no data", and the External_customer_evaluation is "positive".
(1) The same as step 1 for case A.
(2) Since the value of the variable Documentation_availability is "no", the IE rejects rule R4.
(3) During further steps, rules R6 and R8 are confirmed and, in consequence, rules R13 and R14 are rejected and removed from the stack.
(4) The IE selects rule R11 from the stack (or rule R12 which, after verification, has the same cost as rule R11).
(5) In both cases it is necessary to determine the value of Customer_evaluation variable; the ICM searches for rules determining the value of that variable (R15, R16, R17, and R18) and determines their cost, orders them and places them on stack.
(6) First of all, the IE selects rule R17 from the stack, followed by R18; since the variable in the premises of both rules, Customer_record, has the value of "no data", both rules are rejected and removed from the stack; the IE selects rule R15 from the stack.
(7) The first premise of rule R15 is true and the IE verifies the External_customer_evaluation="negative" premise; reasoning is suspended; the stack contents are stored in an external resource.
(8) After the desired information has been obtained, the reasoning procedure is resumed and the stack is recreated; the IE returns to rule R15 (the highest on the stack).
(9) The premise External_customer_evaluation="negative" is false, rule R15 is rejected and removed from the stack;
(10) The IE returns to rule R16 remaining on the stack; all its premises are true and the IE, having executed it, sets the value of the Order_evaluation variable to "positive".
(11) The IE returns to rule R11 remaining on the stack and, since the premise is true, sets the value of the Order_evaluation variable to "accept".
(12) Since the final condition (determining the value of the target variable, Order_evaluation) has been met, the IE stops reasoning.

Due to the possibility of "remembering" the rules (and variables) on stack, the reasoning is continued after the suspension in the same way without interrupting the process.

Figure 7:
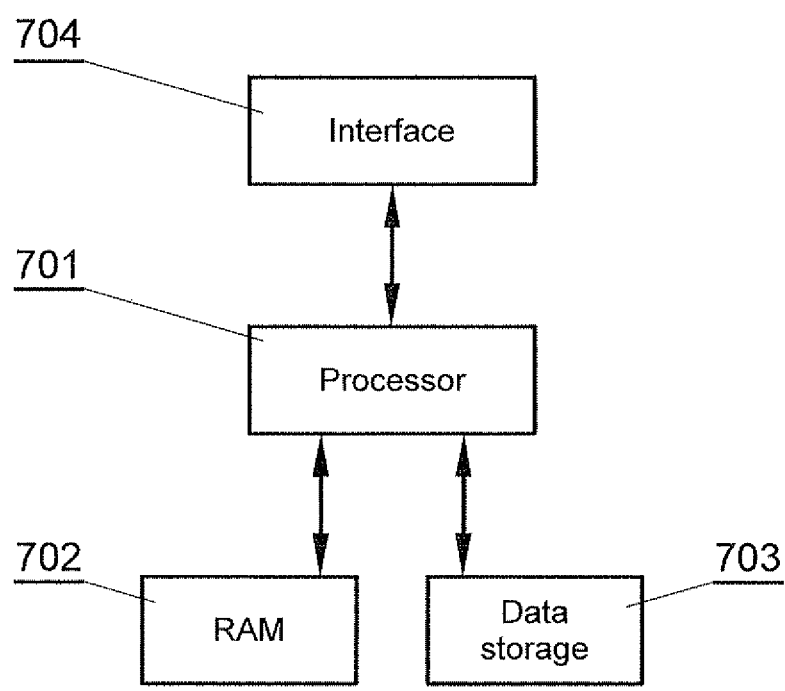
FIG. 7 presents a block diagram of a computer system by means of which the inference system according to the invention can be implemented.

FIG. 7 presents the block diagram of a computer system by means of which the inference system according to the invention can be implemented. The inference engine 110, the data interface 120, and the inference control module 130 can be implemented as a computer program managed by a computer 700 equipped with a processor 701 adapted for executing software in a RAM 702 (which also manages the stack 150). The database 140 data can be stored in a data memory 703. The inference system can be also implemented as a software module available on the same computer as the software of the inference system. The inference system can also be implemented as a remote service provided on a server placed remotely in relation to the computer on which the software of the inference system is executed. The data memory 703 can be a local memory or a remote memory. The system receives instructions and outputs data by means of an interface 704, which can be a human-computer interface, for example a graphical user interface, as well as a computer-computer interface, for example an API for providing system resources for other systems or applications.

While the invention presented herein has been depicted, described, and has been defined with reference to particular preferred embodiments, such references and examples of implementation in the foregoing specification do not imply any limitation on the invention. It will, however, be evident that various modifications and changes may be made thereto without departing from the broader scope of the technical concept. The presented preferred embodiments are exemplary only, and are not exhaustive of the scope of the technical concept presented herein.

Accordingly, the scope of protection is not limited to the preferred embodiments described in the specification, but is only limited by the claims that follow.

We claim:

1. A computer-implemented method for processing rules in an inference system in order to determine a value of a target variable by an inference engine, the method comprising:

determining the value of the target variable on the basis of a reasoning sequence comprising a set of rules to define conclusions depending on premises, the premises being functions of values of variables, wherein the variables are one of:

source variables, each having a source variable cost that defines a cost of acquisition of a value of the source variable, the source variable cost being stored in a database; and, regulated variables, each having a value dependent on the conclusions of the rules and a regulated variable cost that defines a cost of acquisition of the value of the regulated variable, the regulated variable cost being dependent on the cost of each variable in the premises and the conclusion of a particular rule, controlling an operation of the inference engine by an inference control module; and determining, by the inference control module, the reasoning sequence by:

reading the source variable cost of each source variable from the database;

identifying target rules that allow to determine the value of the target variable;

determining the cost of evaluation of premises and conclusions for each target rule based on the source variable costs and the regulated variable costs for variables associated with that target rule;

evaluating the least costly premise in the least costly rule and recalculating the cost of evaluation of premises and conclusions for the remaining rules, based on results of the evaluation; and, returning to evaluation of the least costly target rule until the value of the target variable has been determined.

2. The method of claim 1, wherein the order of reasoning is determined by placing the rules in order from the least costly rule to the most costly rule on a stack.

3. The method of claim 2, wherein the stack contents are stored in the database before the evaluation of the premise, and wherein the stack is released for other calculations, the readout of the variable value enabling evaluation of the premise is expected, and after that the previous content of the stack is restored from the database.

4. The method of claim 1, wherein the cost of evaluation of premises and conclusions for each rule is calculated as the sum of costs of variables contained in the premises and the conclusions for that rule.

* * * * *